United States Patent Office 3,634,462
Patented Jan. 11, 1972

3,634,462
2,3-DIHYDRO-2,2-DIMETHYL-7-ACETO ACETAMIDOBENZOFURAN
Charles A. Lynch, Jr., Severna Park, Md., assignor to FMC Corporation, New York, N.Y.
No Drawing. Filed June 26, 1968, Ser. No. 740,107
Int. Cl. C07d 5/36; C09b 29/36
U.S. Cl. 260—346.2
1 Claim

ABSTRACT OF THE DISCLOSURE

This specification discloses the novel arylide 2,3-dihydro-2,2-dimethyl-7-acetoacetamidobenzofuran and yellow pigments made by reacting this arylide with salts of diazotized aromatic amines.

BACKGROUND OF THE INVENTION

Field of the invention

Acetoacetarylamides and pigments made therefrom by reacting the arylides with diazonium salts of aromatic amines.

Description of the prior art

Acetoacetarylamides are of commercial interest to the dye and pigment industry in the preparation of yellow pigments which are used in paints and printing inks. The acetoacetarylamides are coupled with a salt of a diazotized aromatic amine in the manufacture of Hansa and benzidiene yellows.

The Hansa yellows have been used for many years in high quality printing inks and for products where color tone, brilliancy and durability are more important than primary cost. More recently, benzidine yellows made with acetoacetarylamides have come into wide use. The Hansa and benzidine yellows are stable and unusually brilliant colors, that have great tinctorial strength. The pigment manufacturers select different acetoacetarylamides to be combined with a variety of diazotized aromatic amines to obtain shades varying from green through yellow.

The Hansa and benzidine yellows are used in textile printing, in plastics, rubber, paint and other miscellaneous applications. The most common use of these pigments is in printing ink where these organic yellows offer good strength, clean shades, and good transparency; they are less abrasive than inorganic pigments and therefore very long press runs are possible.

Printing ink manufacturers prefer to use shades of yellow obtained by varying the chemical starting materials used to produce the pigment rather than by mixing pigments to produce different shades. Combinations of different arylides and diazotized amines produce various shades of yellow; each chemical combination, in addition to producing a distinct shade, also has other distinct properties such as tinctorial strength, light fastness, resistance to extraction by oil or dry cleaning fluids and so forth. Blending pigments to produce shades used in printing textiles, for example, results in printed patterns that change color and shade in sunlight and can also change due to dry cleaning, washing and the like. New arylides are always in demand because there is always a desire for improved properties.

A principal object of this invention is to make a new arylide that is useful in making high quality yellow pigments.

SUMMARY OF THE INVENTION

I have discovered a new acetoacetarylamide which can be made by reacting 2,3-dihydro-2,2-dimethyl-7-aminobenzofuran with diketene to form an arylide which has the following structure:

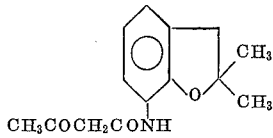

CH₃COCH₂CONH

The 2,3-dihydro-2,2-dimethyl-7-acetoacetamidobenzofuran is a white solid which couples easily with diazonium salts, particularly the diazo salt of nitro toluidine or the tetrazo salt of dichlorobenzidine to form yellow pigments which are particularly suitable for coloring plastics and printing inks and for use in special applications in coloring wall paper, other papers and lacquer. The pigments formed from this new arylide have good light fastness and produce clean shades.

DESCRIPTION OF THE INVENTION AND THE PREFERRED EMBODIMENTS

The arylide of this invention can be made by processes conventionally used for preparing the acetoacetarylamides such as described in U.S. Pats. Nos. 1,982,675 and 2,152,132.

The preferred method of preparing arylides is described in U.S. Pat. No. 3,304,328. Accordingly, the 7-aminobenzofuran and diketene should be reacted in substantially stoichiometric proportions. The 7-aminobenzofuran and diketene should be charged to the reactor containing an inert solvent, concurrently at a rate sufficiently slow to avoid any substantial build-up of the reactants. In other words, the reactants should not be charged to the reactor all at once. The optimum rate of addition will vary depending upon such factors as temperature and amount of solvent present. In any event, the arylide and di-ketene are added at substantially the rate at which they react. A small excess of diketene, corresponding to about 1–3 mole percent may be used if desired. The excess diketene may then be evaporated from the final product.

Diketene of about 90% purity or better should be used. The diketene can be used as a solution in a solvent such as acetone, if desired. The diketene reacts with the 7-aminobenzofuran under relatively mild conditions. The reaction can be conducted at temperatures of about 0 to 50° C., but preferably from about 20 to 30° C.

The acetoacetarylamide of this invention is coupled with diazonium salts, particularly the diazo salt of nitro toluidine or the tetrazo salt of dichlorobenzidine, to form yellow pigments by conventional processes used in the pigment industry. Generally the process for making the pigment comprises making a clear diazonium solution at a temperature near 0° C., adding this solution to a cold solution, also near 0° C., containing the arylide and conducting the reaction with agitation while maintaining the reaction mixture temperature between about 0° C. and 5° C. The reaction mixture, after all or most of the reaction is completed, is in some instances heated to temperatures of 60°–70– C. for a short period of time. The yellow product is recovered by filtration, washing and drying.

The acetoacetarylamide of this invention can be similarly coupled with benzidines having the structure

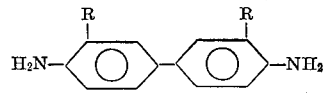

where R is hydrogen, methoxy or methyl, and with ortho-nitroanilines having the structure

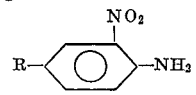

where R is hydrogen or chlorine.

The following examples, illustrating the novel products disclosed herein, are given without any intention that the invention be limited thereto. All parts and percentages are by weight.

Example 1.—Diketene (98% pure) and 2,2-dimethyl-2,3-dihydro-7-aminobenzofuran were fed concurrently to a reactor equipped with an agitator and containing 3,000 parts by weight of VM & P Naphtha (an essentially aliphatic hydrocarbon with a boiling range of 250° to 280° F.). The addition rates of the 7-aminobenzofuran and diketene were adjusted to keep the reactants in approximate stoichiometric balance. The reaction mixture was agitated during the reactant addition and the reaction mixture temperature was controlled between 20° C. and 25° C. The addition of 480 parts of the 7-aminobenzofuran and 258 parts of diketene was completed in 90 minutes. After an additional 60 minutes at 25° C., the mixture which then contained a white solid in suspension, was cooled to 10° C. and filtered. Seven hundred and seventeen parts (717) of solid white product representing a 98% yield was recovered, washed once with VM & P Naphtha, dried, and identified as 2,3-dihydro-2,2-dimethyl-7-acetoacetamidobenzofuran. The product melted at 132°–134° C. and had the following analysis: Carbon, 68.64%; hydrogen, 7.0%; and nitrogen 5.72%. Theoretical values for this compound are carbon 68.0%; hydrogen 6.92%; and nitrogen 5.66%. One part of the acetoacetamide compound dissolved completely in 10 parts of 5% aqueous sodium hydroxide.

Example 2.—The acetoacetarylamide of Example 1 (99 parts by weight) was added to a reactor containing 1200 parts of water. Sodium hydroxide (20 parts of 50% solution) and anhydrous sodium acetate (60 parts) were also added to the reactor. The reaction mixture was agitated during the reactant addition and the reaction mixture was cooled to a temperature of about 4° C.

A diazonium solution of 3,3'-dichlorobenzidine was prepared in the following manner: 65 parts of 3,3'-dichlorobenzidine dihydrochloride was ground with 80 parts of concentrated hydrochloric acid to form a paste, and cooled to 0° C. by the addition of ice. A solution of 27.6 parts of sodium nitrite in 80 parts of water was added dropwise to the paste while maintaining the temperature below 4° C. by further additions of ice. The resulting, essentially clear, solution was then carbon treated and filtered. The cold diazonium solution was then added to the acetoacetarylamide solution over a 25 minute period while maintaining the temperature of the reaction mixture between about 0–5° C. The resulting yellow slurry was stirred an additional 30 minutes, then heated to 60° C. for 20 minutes. The yellow product was recovered by filtration, washing and drying. The product was found to have high color and strength, very good light fastness and a bright clean shade. The final yellow product had the following structure.

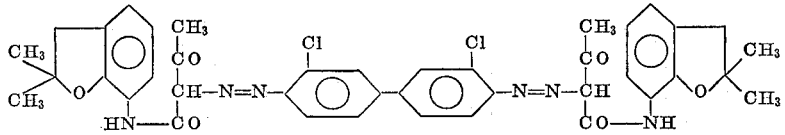

Example 3.—A mixture of 61 parts of 3 - nitro - 4-toluidine and 200 parts of concentrated hydrochloric acid was ground to a paste. Ice (400 parts) was added and then 80 parts of 5 N sodium nitrate solution was added to the ground paste with stirring. The resulting solution was filtered to remove dissolved lumps. An acetoacetarylamide solution containing 99 parts of acetoacetarylamide was prepared as described in Example 2. The two solutions, acetoacetarylamide and the 3-nitro-4-toluidine were both cooled to a temperature of about 4° C. The two solutions were reacted as described in Example 2 while maintaining a reaction temperature of 0° to 5° C. The yellow product was recovered by filtration, washing and drying. The bright yellow product has the following structure

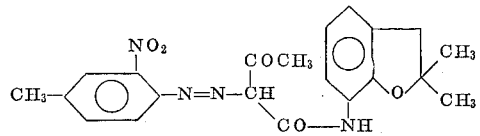

The yellow product had high coloring strength and good light fastness.

Similar products were made by coupling the 2,3-dihydro - 2,2 - dimethyl-7-acetoacetamidobenzofuran with diazo salts of the following amines: benzidine; 3,3'-dimethyl benzidine; 3,3' - dimethoxybenzidine; o - nitroaniline; and 4 - chloro - o - nitro - aniline. In each case the product was a light fast yellow pigment.

As will be apparent to those skilled in the art, numerous modifications and variations of the embodiments illustrated above may be made without departing from the spirit of the invention and the scope of the following claim.

What is claimed is:

1. 2,3 - dihydro - 2,2 - dimethyl - 7 - acetoacetamidobenzofuran.

References Cited

Pentimalli: Chemical Abstracts (1966), vol. 64, p. 6789d.

ALEX MAZEL, Primary Examiner

B. I. DENTZ, Assistant Examiner

U.S. Cl. X.R.

260—152